(12) United States Patent
Okada et al.

(10) Patent No.: US 8,149,474 B2
(45) Date of Patent: *Apr. 3, 2012

(54) IMAGE READING APPARATUS

(75) Inventors: Tomohiko Okada, Kyoto (JP); Takao Horiuchi, Nara (JP); Yoshitaka Okahashi, Kashihara (JP); Yukihito Nishio, Nara (JP); Takeshi Murakami, Kizugawa (JP)

(73) Assignee: Sharp Kabushiki Kaisha, Osaka (JP)

( * ) Notice: Subject to any disclaimer, the term of this patent is extended or adjusted under 35 U.S.C. 154(b) by 825 days.

This patent is subject to a terminal disclaimer.

(21) Appl. No.: 12/196,818

(22) Filed: Aug. 22, 2008

(65) Prior Publication Data
US 2009/0059315 A1 Mar. 5, 2009

(30) Foreign Application Priority Data
Aug. 31, 2007 (JP) ................................. 2007-226979

(51) Int. Cl.
*H04N 1/04* (2006.01)

(52) U.S. Cl. ........ 358/474; 358/518; 358/514; 358/408; 382/318; 382/167

(58) Field of Classification Search .................. 358/518, 358/474, 514, 505, 408, 450, 497, 1.12, 515, 358/520; 382/167, 318, 319, 274, 275, 284
See application file for complete search history.

(56) References Cited

U.S. PATENT DOCUMENTS

| | | | | |
|---|---|---|---|---|
| 5,032,904 A | * | 7/1991 | Murai et al. .................. 358/500 |
| 5,155,587 A | * | 10/1992 | Itoh ............................... 358/529 |
| 5,200,832 A | * | 4/1993 | Taniuchi et al. ............... 358/300 |
| 5,550,651 A | * | 8/1996 | Terajima ........................ 358/496 |
| 5,796,496 A | * | 8/1998 | Ono ............................... 358/498 |
| 5,847,848 A | * | 12/1998 | Suzuki et al. .................. 358/518 |
| 5,859,712 A | * | 1/1999 | Kim ................................ 358/504 |
| 5,914,793 A | * | 6/1999 | Suzuki et al. .................. 358/527 |
| 5,949,922 A | * | 9/1999 | Wada et al. ..................... 382/295 |
| 6,396,595 B1 | * | 5/2002 | Shimazaki ...................... 358/1.9 |
| 6,628,848 B1 | * | 9/2003 | Nakamura ...................... 382/318 |
| 6,757,083 B1 | * | 6/2004 | Nakamura ...................... 358/487 |
| 6,963,429 B2 | * | 11/2005 | Suzuki et al. .................. 358/474 |
| 7,218,421 B2 | * | 5/2007 | Tsuji ............................. 358/3.26 |
| 7,505,182 B2 | * | 3/2009 | Suzuki et al. .................. 358/474 |
| 7,551,328 B2 | * | 6/2009 | Kondo et al. .................. 358/474 |
| 2002/0109856 A1 | * | 8/2002 | Sasanuma et al. .............. 358/1.9 |
| 2003/0053158 A1 | * | 3/2003 | Tsuji ............................. 358/518 |
| 2004/0100667 A1 | * | 5/2004 | Oyama et al. .................. 358/484 |
| 2004/0184115 A1 | * | 9/2004 | Suzuki .......................... 358/474 |

FOREIGN PATENT DOCUMENTS

| | | |
|---|---|---|
| JP | 5-284283 A | 10/1993 |
| JP | 9-321980 A | 12/1997 |
| JP | 2002-247292 A | 8/2002 |
| JP | 2003-60846 A | 2/2003 |
| WO | WO-03/061271 A1 | 7/2003 |

* cited by examiner

*Primary Examiner* — Negussie Worku
(74) *Attorney, Agent, or Firm* — Birch, Stewart, Kolasch & Birch, LLP

(57) ABSTRACT

A control unit inputs a control signal depending on whether reading at a high resolution is selected or reading at a low resolution is selected in an image reading unit. A first delay circuit and a second delay circuit output image data that is captured by a first CCD line sensor and a second CCD line sensor to an adder after retaining the image data for a time in accordance with the input control signal. The adder generates color image data by adding the image data that is captured by the first CCD line sensor to the image data that is captured by the second CCD line sensor.

14 Claims, 8 Drawing Sheets

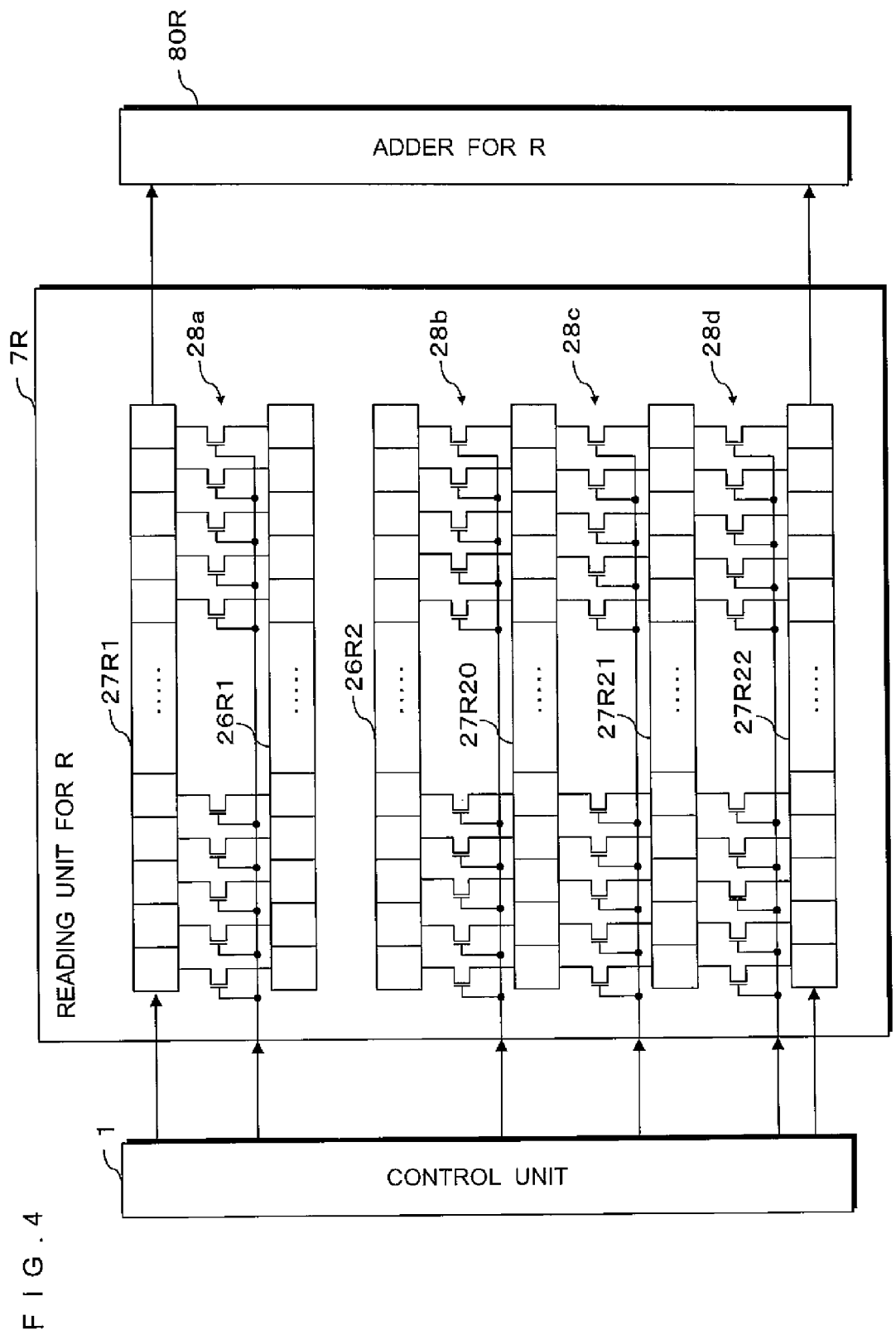

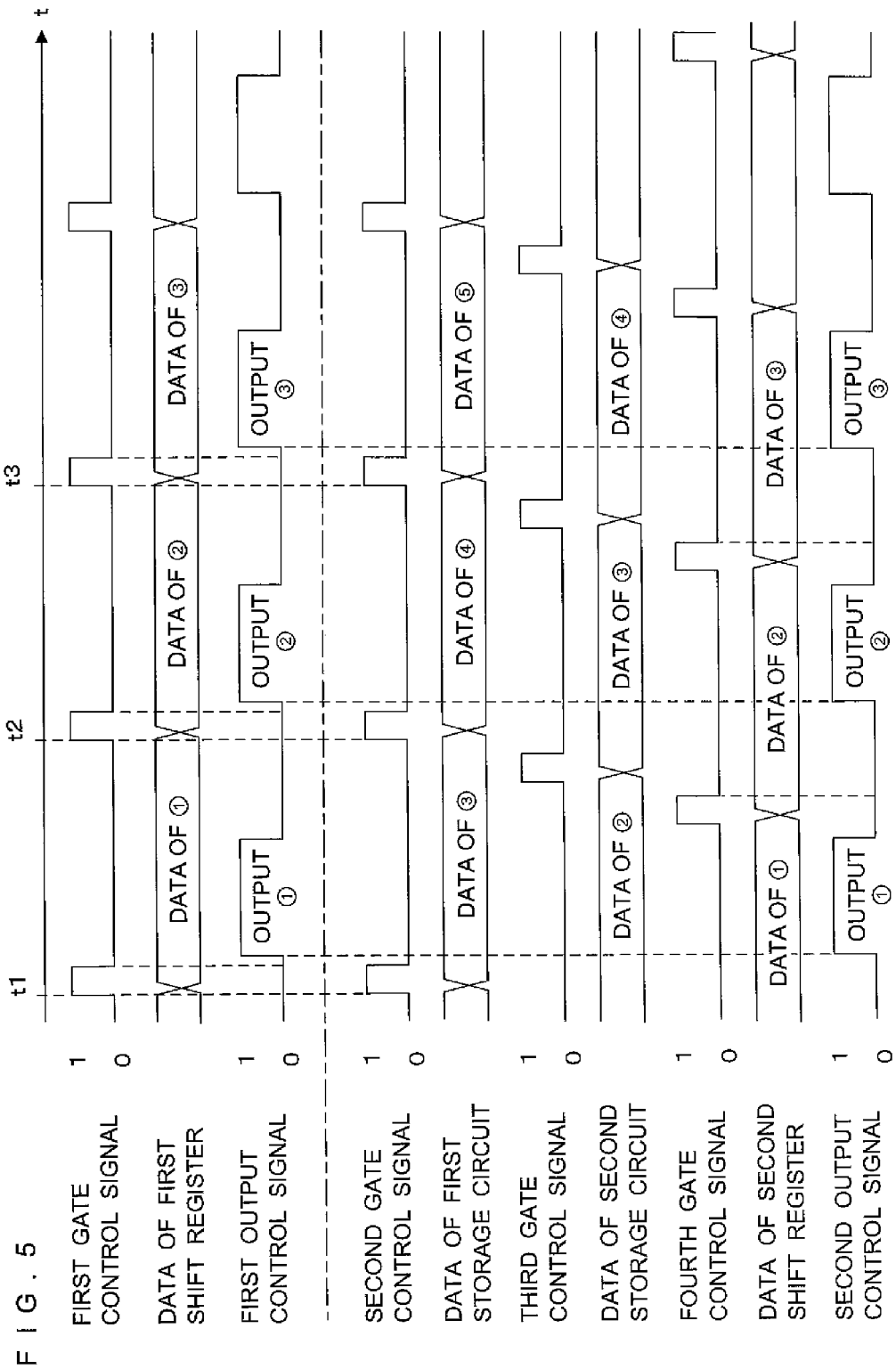

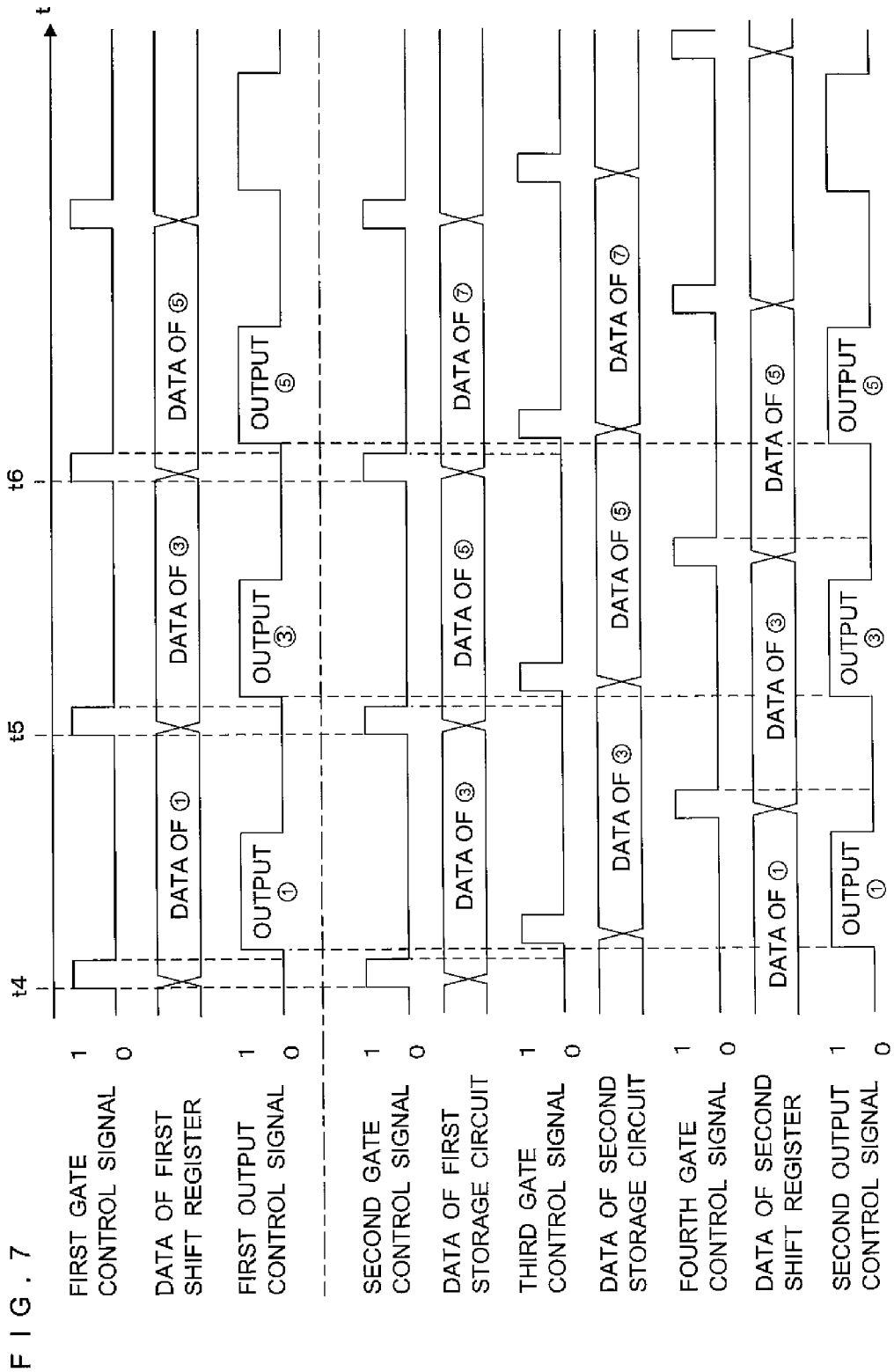

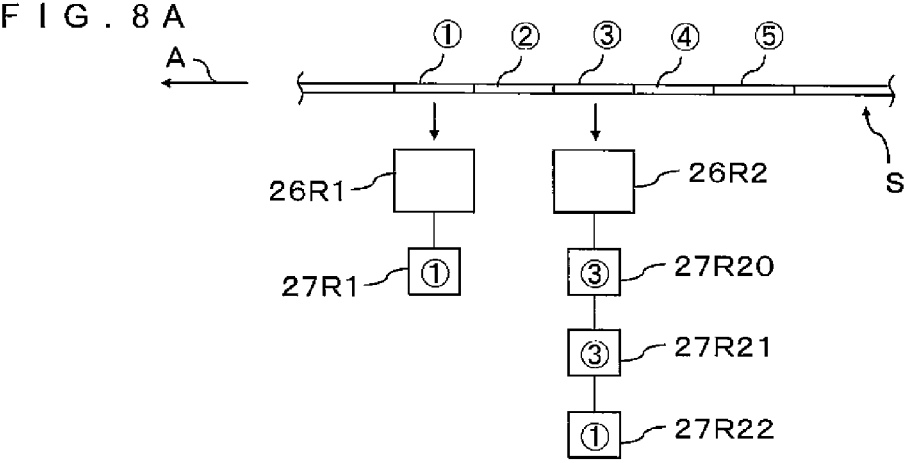
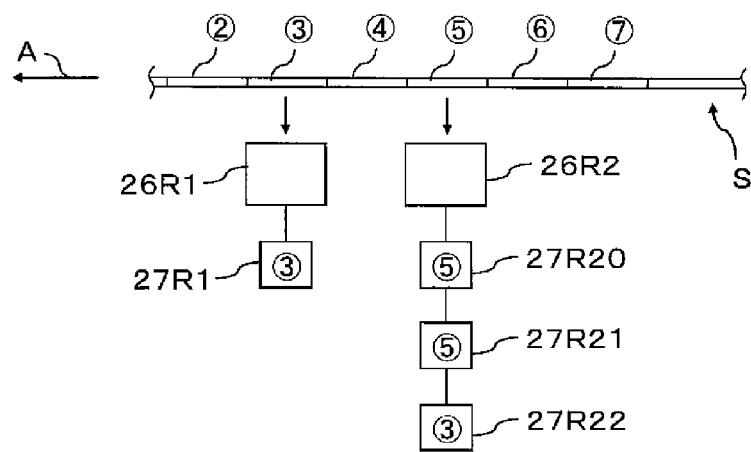
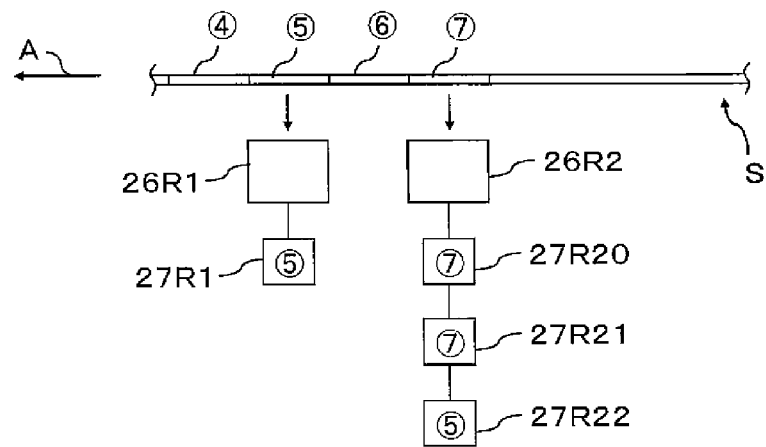

IMAGE READING APPARATUS

CROSS-REFERENCE TO RELATED APPLICATIONS

This Nonprovisional application claims priority under 35 U.S.C. §119(a) on Patent Application No. 2007-226979 filed in Japan on Aug. 31, 2007, the entire contents of which are hereby incorporated by reference.

BACKGROUND

1. Field of the Invention

The present invention relates to an image reading apparatus which enables carrying out processing of reading high-resolution image data from an original document at a high speed.

2. Description of Related Art

A pamphlet of International Publication WO2003/061271 discloses a time delay integration image reading apparatus having a plurality of rows of line sensors that are arranged in a relatively-moving direction (a sub-scanning direction) in parallel and include a plurality of detection elements arranged in a perpendicular direction to a relatively-moving direction to an original document (a main scanning direction), which can capture a high-resolution image data by reading the same position on the original document by the discrete line sensors with a time lag and can combine output from each of the line sensors. The apparatus configured in such a manner can capture high-resolution image data with a good S/N ratio even in a short reading time.

SUMMARY

A conventional image reading apparatus having such a configuration has a problem that such a image reading apparatus cannot read the image at an interval that is narrower than the interval between line sensors because a resolution in a sub-scanning direction depends on the interval between the line sensors that are arranged in the sub-scanning direction in parallel. In other words, even in a case of requiring to acquire a higher resolution than a resolution that is defined by the interval between the line sensors, the apparatus cannot capture the image data by combining the output from each line sensor, so that the apparatus merely can generate image data based on the output from one line sensor. Furthermore, since the image data is generated based on the output from one line sensor in that case, in order to thoroughly save a reading time of the image data for one line by one line sensor (an electric charge accumulation time), it is necessary to make a transport speed of the original document lower in a case of reading the image data with a resolution in accordance with the interval between the line sensors. Thus, this conventional image reading apparatus has a problem that speeding-up of the reading process is difficult.

The present invention has been made taking the foregoing problems into consideration and an object of the present invention is to provide an image reading apparatus which enables reading high-resolution image data at a high speed without necessity for making a reading speed lower even in a case of reading an original document at a high resolution.

The image reading apparatus according to the present invention may include a plurality of image reading units allowed relative movement to the original document. Each of image reading units captures image data by reading an area of the original document with a longitudinal direction (a main scanning direction) perpendicular to the relatively-moving direction (a sub-scanning direction). Each of the image reading units has a reading position separated by a predetermined distance in a sub-scanning direction and captures the image data by changing the reading position in the sub-scanning direction continuously based on a resolution in reading the original document. Further, the image reading apparatus combines the image data captured from the same reading position by each of the image reading units. The combined image data can be treated as the image data that is read from an area of the original document.

According to the present invention, the image data that are read by a plurality of image reading units are combined. Thus, even in the case of reading the original document with a high resolution at a narrower interval than the interval of respective reading positions of a plurality of image reading units in a sub-scanning direction, it is not necessarily to make a relatively-moving speed between the original document and each of the image reading units to be lowered, as compared to a case of reading the original document with a resolution (a low resolution) defined by the interval between the respective reading positions of a plurality image reading units. Therefore, even in the case of carrying out the reading process with a high resolution, the image data can be captured for a reading time equal to a case of carrying out the reading process with a low resolution, and this makes it possible to provide an image reading apparatus with a high efficiency of reading the original document.

The above and further objects and features of the invention will more fully be apparent from the following detailed description with accompanying drawings.

BRIEF DESCRIPTION OF THE SEVERAL VIEWS OF THE DRAWINGS

FIG. 4 is a circuit diagram showing a circuit configuration example of the image reading unit;

FIG. 5 is a time chart for describing control process of the image reading unit by a control unit;

FIG. 7 is a time chart for describing the control process of the image reading unit by the control unit; and FIG. 8A, FIG. 8B, and FIG. 8C are pattern views for describing the reading process by the image reading unit.

DETAILED DESCRIPTION

Figure 1:
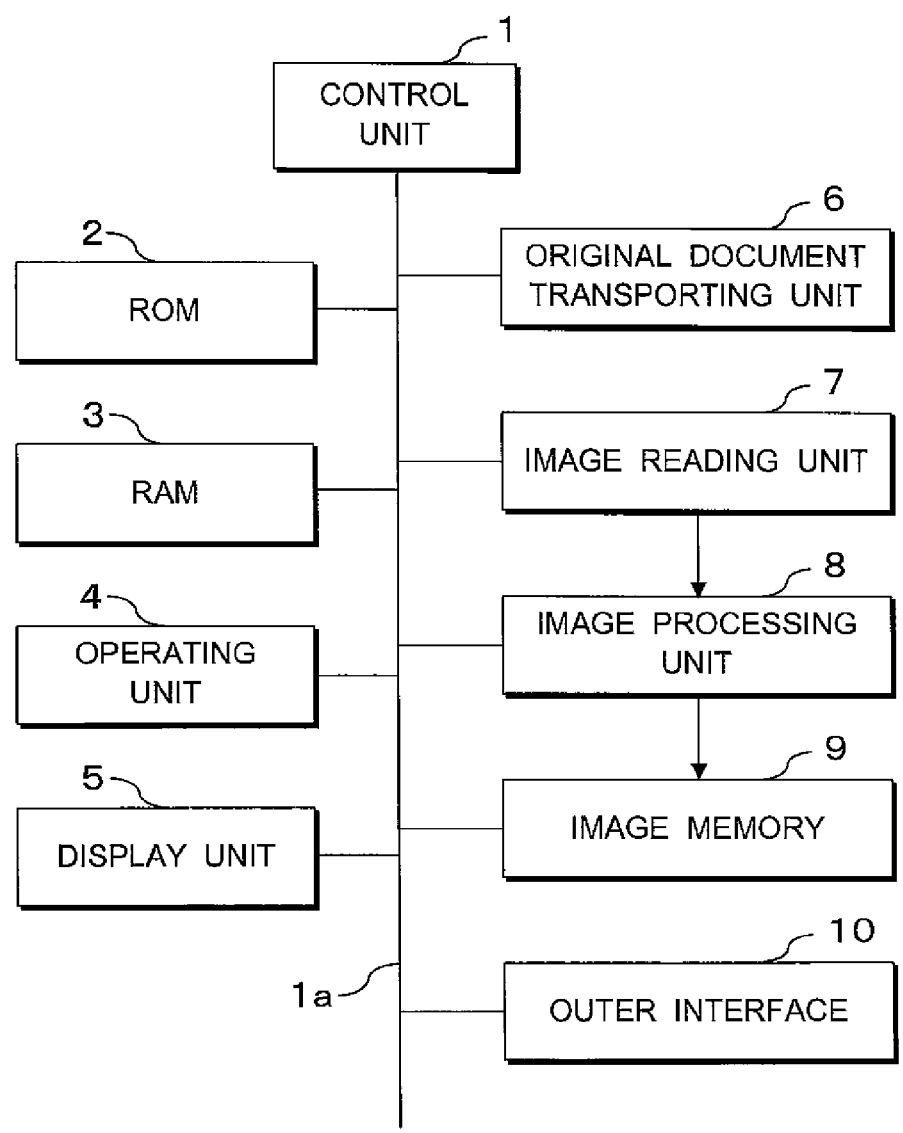
FIG. 1 is a block diagram showing a configuration example of a scanner apparatus applying an image reading apparatus according to the present invention.

Hereinafter, an image reading apparatus according to the present invention will be specifically described with reference to the drawings showing a scanner apparatus which corresponds to an embodiment of this image reading apparatus. FIG. 1 is a block diagram showing a configuration example of a scanner apparatus, to which the image reading apparatus according to the present invention is applied. A scanner apparatus 100 according to the present embodiment is provided with a control unit 1, an ROM 2, an RAM 3, an operating unit 4, a display unit 5, an original document transporting unit 6, an image reading unit 7, an image processing unit 8, an image memory 9, and an outer interface 10 or the like, and each of these hardware units is mutually connected via a bus 1a.

The control unit 1 is formed by a CPU (Central Processing Unit) or an MPU (Micro Processor Unit) or the like, and the control unit 1 may control the operation of each of the above-described hardware units while accordingly reading out a control program pre-stored in the ROM 2 to the RAM 3 and running the control program. The ROM 2 pre-stores various control programs, which are necessary for operating the scanner apparatus 100 as the image reading apparatus according to the present invention. The RAM 3 is formed by a SRAM, a DRAM, or a flash memory or the like, and may temporarily store various data to be generated upon running of the control program by the control unit 1.

The operating unit 4 is provided with various operation keys, which are necessary for a user to operate the scanner apparatus 100, and the operating unit 4 may accept input of a set value, and an instruction of beginning execution or the like for the processing carried out by the scanner apparatus 100. According to the present embodiment, the operating unit (the accepting unit) 4 may accept a selection of a resolution, for example, specifically, a high resolution or a low resolution for the reading process to capture the image data when the scanner apparatus 100 reads the original document. In a case where various operation keys are operated by the user, the operating unit 4 may send a control signal corresponding to the operated operation key, and the control unit 1 may carry out the processing corresponding to the control signal, which is acquired from the operating unit 4.

The display unit 5 is a liquid crystal display, for example, and the display unit 5 may display operating situations of the scanner apparatus 100, various information input via the operating unit 4, and information to be noticed to the user or the like.

The original document transporting unit 6 may transport the original documents layered on a predetermined document tray 16 (refer to FIG. 2) to a predetermined reading position, while separating the original documents one by one and introducing them therein.

The image reading unit 7 may comprise a scanner with a CCD (Charge Coupled Device), for example. The image reading unit 7 scans an image that is recorded in the original document transported to the reading position by the original document transporting unit 6, reads the analog image data, and sends the read image data to the image processing unit 8.

The image processing unit 8 is provided with an A/D converter (not illustrated), for example, to convert the image data sent from the image reading unit 7 into a digital image data, and carry out various image process on the image data. Further, with respect to the image data, the image processing unit 8 may carry out correction processing, various color adjustment process, and gamma conversion process or the like for removing various distortions generated in an illumination system, an imaging system, and an image pickup system or the like of the image reading unit 7. The image processing unit 8 may send the image data to the image memory 9 after performance of the image process. The image memory 9 is formed by a DRAM, for example, and may store the image data sent from the image processing unit 8 on a page-by-page basis.

The outer interface 10 is an interface used for connecting the apparatus to a cable or a network, and may carry out transmission and reception of the data between the apparatus and an outer device such as a computer connected via the cable or the network. The image data stored in the image memory 9 is sent to the outer interface 10 in accordance with the instruction from the control unit 1, and then sent from the outer interface 10 to the outer device. Further, a scanner apparatus 100 can be operated in accordance with instructions from the outer device connected thereto via the cable or the network, too. In this case, the outer interface 10 may acquire a control signal form the outer device and may send the acquired control signal to the control unit 1.

Figure 2:
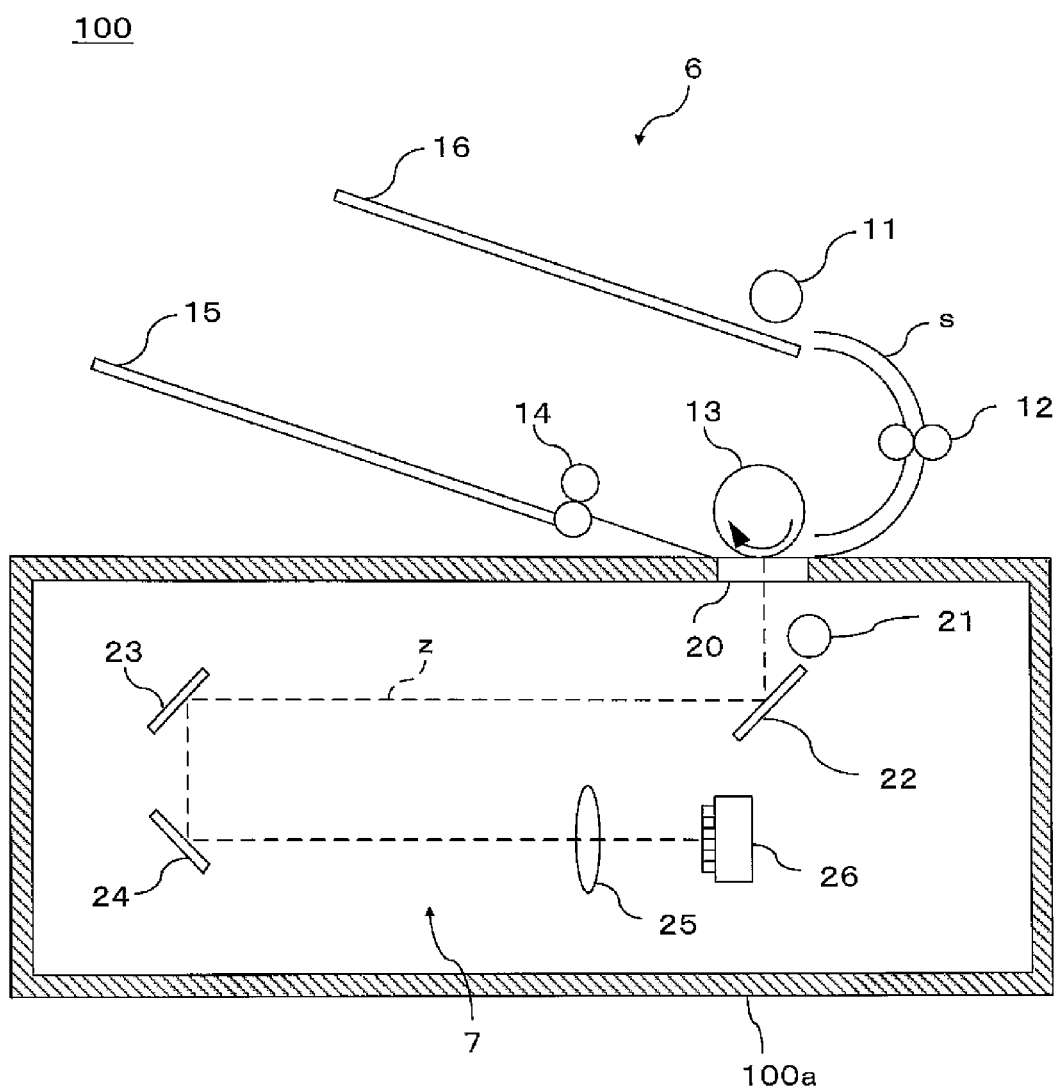
FIG. 2 is a longitudinal sectional view showing an inner configuration example of the scanner apparatus.

FIG. 2 is a longitudinal sectional view showing an inner configuration example of the scanner apparatus 100. In the scanner apparatus 100, an original document transporting unit 6 is attached on the upper face of a housing 100*a*. The original document transporting unit 6 is provided with a ejection tray 15 mounted upward of the upper face of the housing 100*a*, and an original document tray 16 mounted upward of the ejection tray 15. Then, the original document transporting unit 6 can transport the original document mounted on the original document tray 16 to the ejection tray 15 along a predetermined transportation path s. Further, the original document tray 16 and the ejection tray 15 are obliquely arranged so that each right end is lowered than each left end.

In addition, the original document transporting unit 6 is provided with a pickup roller 11, a transport roller 12, a columnar shaped platen roller 13, and a ejection roller 14. The pickup roller 11 is mounted in the vicinity of the right end of the original document tray 16 to separate the original documents layered on the original document tray 16 with their faces turned upward, one by one from the highest layer, and to introduce them into the transport path s, continuously. The transport roller 12 is mounted on the transport path s to transport the original document introduced by the pickup roller 11 along the transport path s, to the upper face of a platen glass 20 fitted on the upper face of the housing 100*a*.

The platen roller 13 is arranged upward of the platen glass 20 and a rotational axis of the platen roller 13 is arranged in parallel with a longitudinal direction of the platen glass 20. Then, the platen roller 13 may transport the original document transported to the platen glass 20 while pressing it on the upper face of the platen glass 20. The ejection roller 14 is mounted in the vicinity of the right end of the ejection tray 15 to discharge the original document that is transported by the platen roller 13 onto the ejection tray 15.

The original document transporting unit 6 is further provided with a driving motor (not illustrated) for rotating a pickup roller 11, a transport roller 12, a columnar shaped platen roller 13, and an ejection roller 14, respectively. The original document transporting unit 6 transports the original document along a predetermined transportation path s by driving the driving motor, and then by starting and stopping the rotation of each roller, in accordance with the instruction from the control unit 1.

Further, the control unit 1 may control the driving motor so as to change rotational speed of each roller depending on whether reading with a high resolution or with a low resolution is selected via the operating unit 4. Specifically, the control unit 1 may rotate each roller faster in a case where reading with a low resolution is selected than a case where reading with a high resolution is selected, to control a transport speed of an original document for reading to be faster. In other words, the control unit 1 may control a relatively-moving speed between the original document and the image reading unit 7 so as to be faster.

In addition, the scanner apparatus 100 is provided with the image reading unit 7 in the inside of the housing 100*a*, and provided with, on the upper face of the housing 100*a*, the rectangular platen glass 20 having a longitudinal direction in parallel with a depth direction of FIG. 2, at the right-leaning location from a center of FIG. 2. The image reading unit 7 is provided with a light source lamp 21 formed by a white fluorescent lamp or a cold-cathode tube or the like downward of the platen glass 20 within the housing 100*a*. The light source lamp 21 is arranged with a longitudinal direction thereof in parallel with a longitudinal direction of the platen glass 20, and may irradiate a light onto the original document transported on the platen glass 20.

The image reading unit 7 is provided with a platy first mirror 22, second mirror 23, and third mirror 24 to change an optical path z of a light reflected from the original document, and the mirrors 22, 23, and 24 are arranged on respective predetermined positions with a longitudinal direction of each of the mirrors 22, 23, and 24 in parallel with the longitudinal direction of the platen glass 20. In addition, the image reading unit 7 is provided with a condenser lens 25 for condensing the light reflected from the original document, of which light path z is changed by the first mirror 22, the second mirror 23, and the third mirror 24, and provided with a CCD line sensor 26 entered, through a condenser lens 24, the light reflected from the original document.

The CCD line sensor 26 comprises many photodiodes (photoelectric converting devices) for converting the incident light into analog electric signals corresponding to the light volume. The photodiodes are arranged in a direction parallel with the longitudinal direction of the platen glass 20.

According to such a configuration, the original document transporting unit 6 may transport the original document mounted on the original document tray 16 to an appropriate reading position on the platen glass 20 by the pickup roller 11 and the transport roller 12. In addition, the original document transporting unit 6 may transport the original document transported on the platen glass 20, toward a moving direction (a sub-scanning direction) perpendicular to a longitudinal direction (a main scanning direction) of the platen glass 20, by the platen roller 13 and the ejection roller 14. The image reading unit 7 may illuminate the light source lamp 21 when the original document transporting unit 6 is transporting the original document on the platen glass 20 and may receive the light reflected from the original document by the CCD line sensor 26.

As a result, when the original documents that are separated one by one and transported are pressed on the upper face of the platen glass 20 by the platen roller 13, the image reading unit 7 may introduce the light reflected from the original document after irradiation from the light source lamp 21 each line, with the use of the CCD line sensor 26. The COD line sensor 26 continues acquisition of the light reflected from the original document, during a time until one sheet of the original document passes through on the platen glass 20. Thus, one sheet of the original document can be entirely read during the time. The CCD line sensor 26 may send the light reflected from the original document, as an analog electric signal (the image data), to the image processing unit 8.

Further, according to the present embodiment, two COD line sensors 26 are provided for R (red), G (green), and B (blue), respectively, and respective two CCD line sensors 26 for R, G, and B are mounted so that the positions separated each other from a predetermined distance in the sub-scanning direction of the original document become their reading positions, respectively.

Figure 3:
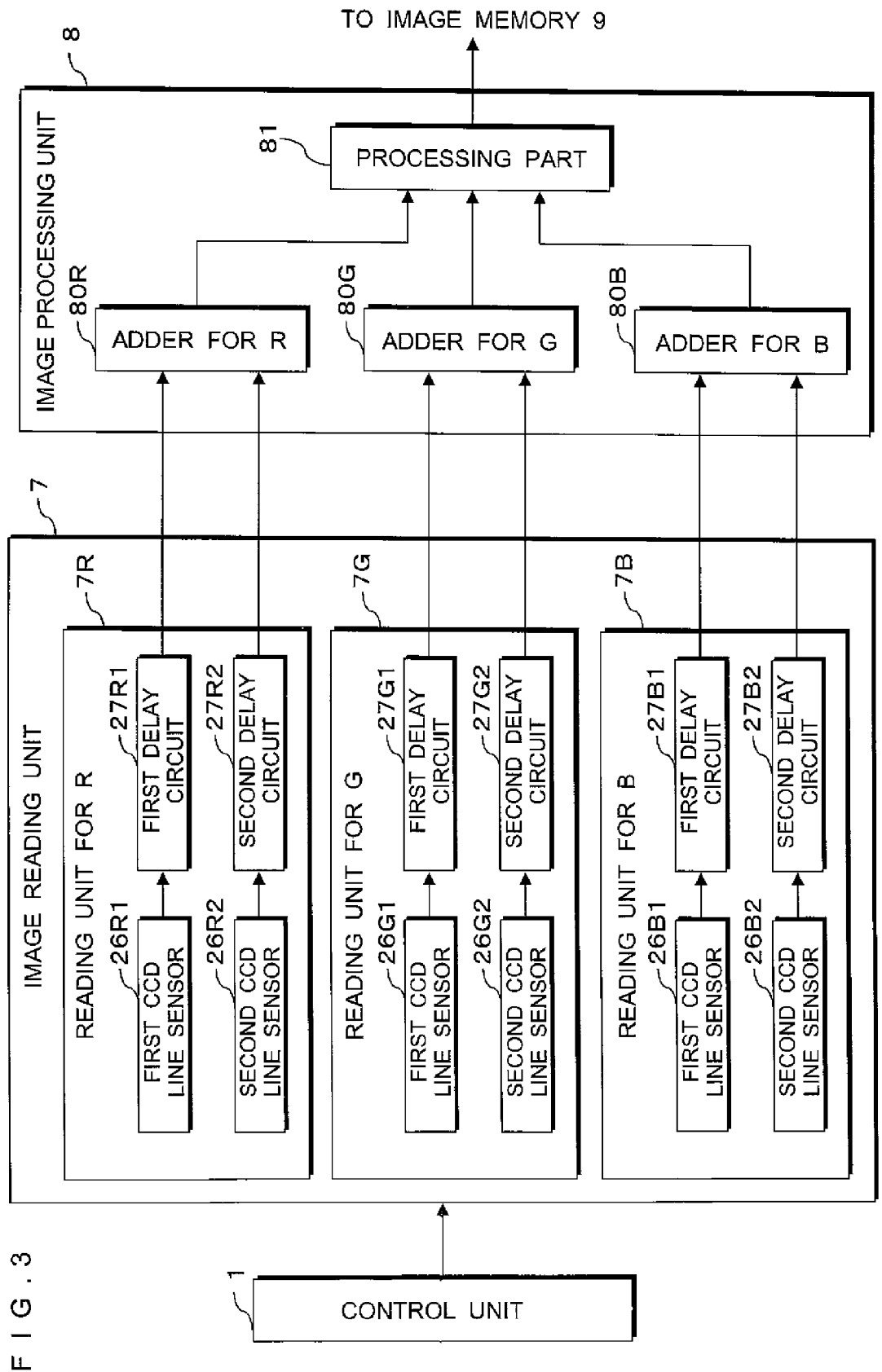
FIG. 3 is a block diagram showing configuration examples of an image reading unit and an image processing unit.

FIG. 3 is a block diagram showing configuration examples of the image reading unit 7 and the image processing unit 8. The image reading unit 7 is provided with a reading unit 7R for R, a reading unit 7G for G, and a reading unit 7B for B, respectively. Each of the reading unit 7R for R, the reading unit 7G for G, and the reading unit 7B for B is provided with first CCD line sensors (photoelectric conversion devices) 26R1, 26G1, and 26B1; second CCD line sensors (photoelectric conversion devices) 26R2, 26G2, and 26B2; first delay circuits 27R1, 27G1, and 27B1; and second delay circuits 27R2, 27G2, and 27B2, respectively.

Each of the first CCD line sensors 26R1, 26G1, and 26B1 is connected to each of the first delay circuits 27R1, 27G1, and 27B1, respectively, and the image data captured by the first CCD line sensors 26R1, 26G1, and 26B1 based on the reflected light from the original document is input once in the first delay circuits 27R1, 27G1, and 27B1, respectively. The input image data is transmitted to the image processing unit 8 after being retained by the first delay circuits 27R1, 27G1, and 27B1, respectively for a predetermined time.

Each of the second CCD line sensors 26R2, 26G2, and 26B2 is connected to each of the second delay circuits 27R2, 27G2, and 27B2, respectively, and the image data captured by the second CCD line sensors 26R2, 26G2, and 26B2 based on the reflected light from the original document is input once in the second delay circuits 27R2, 27G2, and 27B2, respectively. The input image data is transmitted to the image processing unit 8 after being retained by the second delay circuits 27R2, 27G2, and 27B2, respectively for a predetermined time.

The image processing unit 8 is provided with an adder (a combining unit) 80R for R, an adder (a combining unit) 80B for B, an adder (a combining unit) 80B for B, and a processing part 81 or the like. The first delay circuit 27R1 and the second delay circuit 27R2 of the reading unit 7R for R are connected to the adder 80R for R, respectively, and the image data output from the first delay circuit 27R1 and the second delay circuit 27R2 are input in the adder 80R for R to be added (combined).

Similarly, the first delay circuit 27G1 and the second delay circuit 27G2 of the reading unit 7G for G are connected to the adder 80G for G, respectively, and the image data output from the first delay circuit 27G1 and the second delay circuit 27G2 are input in the adder 80G for G to be added. The first delay circuit 27B1 and the second delay circuit 27B2 of the reading unit 7B for B are connected to the adder 80B for B, respectively, and the image data output from the first delay circuit 27B1 and the second delay circuit 27B2 are input in the adder 80B for B to be added.

Each of the adder 80R for R, the adder 80G for G, and the adder 80B for B is connected to the processing part 81, and sends to the processing part 81 the image date of a R component, a G component, and a B component, which are acquired by addition, respectively. After converting the analog image data, which is input from each of the adder 80R for R, the adder 80G for G, and the adder 80B for B, into the digital image data by means of the A/D converter, the processing part 81 may carry out predetermined image process and may store the acquired digital color image data in the image memory 9.

The control unit 1 may send a control signal, depending on whether reading with a high resolution or reading with a low resolution is selected via the operating unit 4, to the image reading unit 7. Then, a reading unit 7R for R of the image reading unit 7, a reading unit 7G for G of the image reading unit 7, and a reading unit 7B for B of the image reading unit 7 may operate the first CCD line sensors 26R1, 26G1, and 26B1; the second CCD line sensors 26R2, 26G2, and 26B12; the first delay circuits 27R1, 27G1, and 27B1; and second delay circuits 27R2, 27G2, and 27B2, respectively in accordance with the control signal from the control unit 1 to capture the image data based on the light reflected from the original document.

Hereinafter, the circuit configuration of the image reading unit 7 will be specifically described. FIG. 4 is a circuit diagram showing a circuit configuration example of the image reading unit 7. Further, in order to simplify the description, the reading unit 7R for R of the image reading unit 7 is only illustrated, however, the reading unit 7G for G, and the reading unit 7B for B are configured as well as the reading unit 7R for R.

In the reading unit 7R for R, each of many photodiodes to form the first CCD line sensor 26R1 is connected to each of many registers to form the first delay circuit (the first shift register) 27R1 via a first shift gate circuit 28a. The first shift gate circuit 28a is formed by an n channel type MOS (Metal Oxide Semiconductor) transistor, for example, and a source terminal of the transistor is connected to each photodiode of the first CCD line sensor 26R1, and a drain terminal of the transistor is connected to each register of the first shift register (a retaining device) 27R1.

A gate terminal of each transistor of the first shift gate circuit 28a is connected to the control unit 1, and the control unit 1 may input first gate control signals "1" and "0" for switching ON and OFF of each transistor in the gate terminal of each transistor. In a case where the first gate control signal "1" is input in the gate terminal from the control unit 1, the first shift gate circuit 28a may connect each photodiode of the first delay circuit 26R1 to each register of the first delay circuit 27R1. In this case, electric charges (signals) accumulated in respective photodiodes of the first CCD line sensor 26R1 are transferred to each register of the first delay circuit 27R1. In other words, an electric charge corresponding to the light entered to the first CCD line sensor 26R1 is transferred to the first delay circuit 27R1.

Further, in a case where the first gate control signal "0" is input in the gate terminal from the control unit 1, the first shift gate circuit 28a may block connection between each photodiode of the first CCD line sensor 26R1 and each register of the first delay circuit 27R1.

The control unit 1 may input a first output control signal to output a signal retained by each register of the first delay circuit 27R1 in the first delay circuit 27R1. In the first delay circuit 27R1, a clock signal is input from the control unit 1 or the outside, and in a case where the first output control signal "1" is input from the control unit 1 in the first delay circuit 27R1, the first delay circuit 27R1 may output a signal retained by each register to the adder 80R for R in series in synchronization with the clock signal. Thereby, the image data captured by the first CCD line sensor 26R1 can be sent to the image processing unit 8 after being retained by the first delay circuit 27R1 at once.

On the other hand, in the reading unit 7R for R, each of many photodiodes to form the second CCD line sensor 26R2 is connected to each of many devices to form a first storage circuit 27R20, respectively, via a second shift gate circuit 28b. The second shift gate circuit 28b is also formed by an n channel type MOS transistor, for example, and a source terminal of the transistor is connected to each photodiode of the second CCD line sensor 26R2, and a drain terminal of the transistor is connected to each device of the first storage circuit 27R2.

A gate terminal of each transistor of the second shift gate circuit 28b is connected to the control unit 1, and the control unit 1 may input second gate control signals "1" and "0" for switching ON and OFF of each transistor in the gate terminal of each transistor. In a case where the second gate control signal "1" is input in the gate terminal from the control unit 1, the second shift gate circuit 28b may connect each photodiode of the second delay circuit 26R2 to each device of the first storage circuit 27R20. In this case, electric charges (signals) accumulated in respective photodiodes of the second CCD line sensor 26R2 are transferred to each device of the first storage circuit 27R20. In other words, an electric charge corresponding to the light entered to the second CCD line sensor 26R2 is transferred to the first storage circuit 27R20.

Further, in a case where the second gate control signal "0" is input in the gate terminal from the control unit 1, the second shift gate circuit 28b may block connection between each photodiode of the second CCD line sensor 26R2 and each device of the first storage circuit 27R20.

Each of the devices of the first storage circuit 27R20 is connected to each of many devices to form a second storage circuit 27R21 via a third shift gate circuit 28c. The third shift gate circuit 28c is also formed by an n channel type MOS transistor, for example, and a source terminal of the transistor is connected to each device of the first storage circuit 27R20, and a drain terminal of the transistor is connected to each device of the second storage circuit 27R21.

A gate terminal of each transistor of the third shift gate circuit 28c is connected to the control unit 1, and the control unit 1 may input third gate control signals "1" and "0" for switching ON and OFF of each transistor in the gate terminal of each transistor. In a case where the third gate control signal "1" is input in the gate terminal from the control unit 1, the third shift gate circuit 28c may connect each device of the first storage circuit 27R20 to each device of the second storage circuit 27R21. In this case, the signals stored in respective devices of the first storage circuit 27R20 are transferred to each device of the second storage circuit 27R21. In other words, the data retained by the first storage circuit 27R20 is transferred to the second storage circuit 27R21.

Further, in a case where the third gate control signal "0" is input in the gate terminal from the control unit 1, the third shift gate circuit 28c may block connection between each device of the first storage circuit 27R20 and each device of the second storage circuit 27R21.

Each of the devices of the second storage circuit 27R21 is connected to each of many registers to form the second shift register 27R22 via a fourth shift gate circuit 28d. The fourth shift gate circuit 28d is also formed by an n channel type MOS transistor, for example, and a source terminal of the transistor is connected to each device of the second storage circuit 27R21, and a drain terminal of the transistor is connected to each register of the second shift register 27R22.

A gate terminal of each transistor of the fourth shift gate circuit 28d is connected to the control unit 1, and the control unit 1 may input fourth gate control signals "1" and "0" for switching ON and OFF of each transistor in the gate terminal of each transistor. In a case where the forth gate control signal "1" is input in the gate terminal from the control unit 1, the fourth shift gate circuit 28d may connect each device of the second storage circuit 27R21 to each register of the second shift register 27R22. In this case, the signals stored in respective devices of the second storage circuit 27R21 are transferred to each register of the second shift register 27R22. In other words, the data retained by the second storage circuit 27R21 is transferred to the second shift register 27R22.

Further, in a case where the forth gate control signal "0" is input in the gate terminal from the control unit 1, the forth shift gate circuit 28d may block connection between each device of the second storage circuit 27R21 and each register of the second shift register 27R22.

The control unit 1 may input a second output control signal to output a signal retained by each register of the second shift register 27R22 in the second shift register 27R22. In the second shift register 27R22, a clock signal is input from the control unit 1 or the outside, and in a case where the second output control signal "1" is input from the control unit 1 in the second shift register 27R22, the second shift register 27R22 may output a signal retained by each register to the adder 80R for R in series in synchronization with the clock signal. Thereby, the image data captured by the second CCD line sensor 26R2 can be sent to the image processing unit 8 after being retained by the second delay circuit 27R2 at once, which is formed by the first storage circuit 27R20, the second storage circuit 27R21, and the second shift register 27R22.

Hereinafter, it is specifically described about the control process of the image reading unit 7, which is carried out by the control unit 1 when the scanner apparatus 100 with the above-described configuration reads the original document. Furthermore, it is specifically described about the reading process, which is carried out by the image reading unit 7 in accordance with the control of the control unit 1. In order to simplify the description, in the following description, only the reading unit 7R for R of the image reading unit 7 will be described, however, the image reading unit 7G for G and the image reading unit 7B for B will also carry out the same process.

At first, it is described about the control process carried out by the control unit 1 and the reading process to be carried out by the image reading unit 7, when reading with a high resolution is instructed via the operating unit 4. Specifically, described below is about the reading process with a high resolution to read the image at a narrower interval than the interval between the reading positions of the first CCD line sensor 26R1 and the second CCD line sensor 26R2, which are provided to the reading unit 7R for R of the image reading unit 7. FIG. 5 is a time chart for describing the control process of the image reading unit 7 by the control unit 1, and FIG. 6A, FIG. 6B, and FIG. 6C are pattern views for describing the reading process by the image reading unit 7.

FIG. 5 shows a first gate control signal input in the first shift gate circuit 28a by the control unit 1; the data retained by the first shift register 27R1; a first output control signal input in the first shift register 27R1 by the control unit 1; a second gate control signal input in the second shift gate circuit 28b by the control unit 1; the data retained by the first storage circuit 27R20; a third gate control signal in the third shift gate circuit 28c by the control unit 1; the data retained by the second storage circuit 27R21; a fourth gate control signal input in the fourth shift gate circuit 28d by the control unit 1; the data retained by the second shift register 27R22; and a second output control signal input in the second shift register 27R22 by the control unit 1, from the top to the bottom with a lateral axis defined as a temporal axis.

In other words, the signals related to the first CCD line sensor 26R1 and the first delay circuit 27R1 are described at upper portions from a dashed-dotted line of FIG. 5, and the signals related to the second CCD line sensor 26R2 and the first delay circuit 27R2 are described at lower portions from the dashed-dotted line of FIG. 5.

Figure 6A:
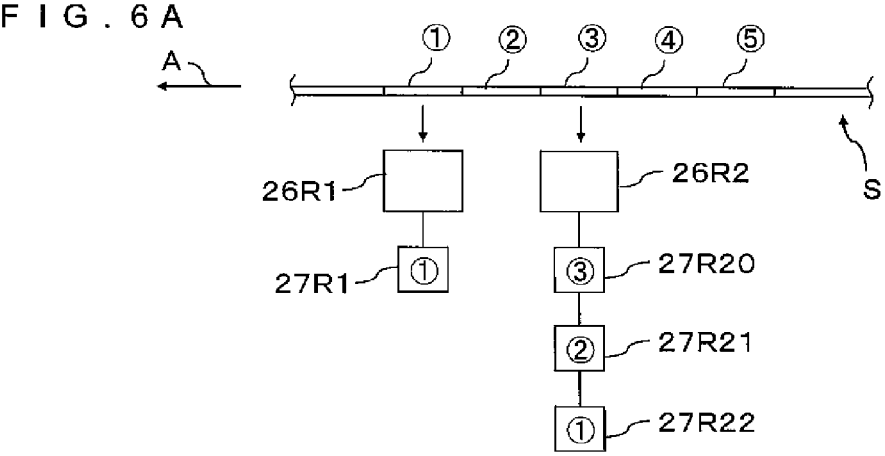
FIG. 6A, FIG. 6B, and FIG. 6C are pattern views for describing the reading process by the image reading unit.
Figure 6B:
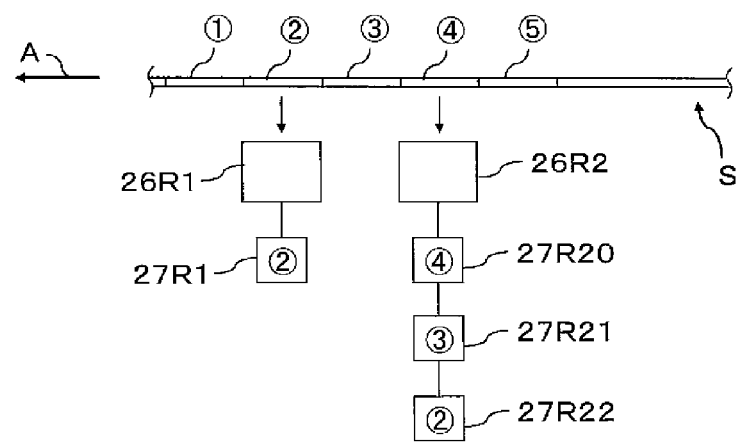
Figure 6C:
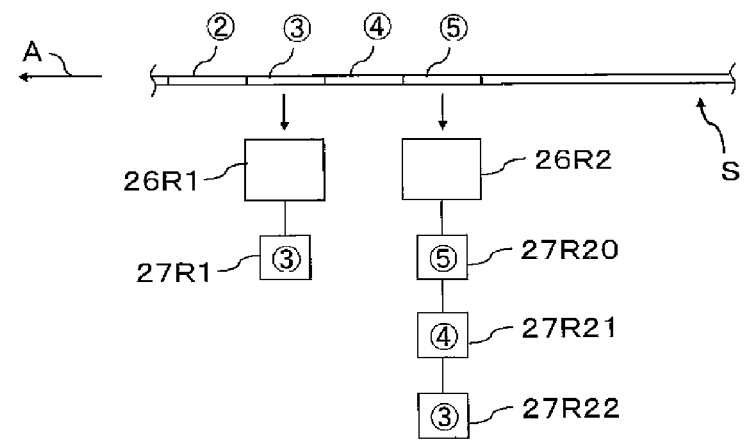

FIG. 6A, FIG. 6B, and FIG. 6C paternally show status when the reading unit 7R for R of the image reading unit 7 is reading the original document. FIG. 6A shows the status at a timing t1 in FIG. 5; FIG. 6B shows the status at a timing t2 in FIG. 5; and FIG. 6C shows the status at a timing t3 in FIG. 5, respectively. Further, FIG. 6A, FIG. 6B, and FIG. 6C show views looking, from a horizontal direction perpendicular to the sub-scanning direction, an original document S moving in a direction shown by an arrow A (a sub-scanning direction); and reference numerals "1" to "5" in FIG. 6A, FIG. 6B, and FIG. 6C show reading areas read by the first CCD line sensor 26R1 and the second CCD line sensor 26R2 with a longitudinal direction according with a main scanning direction.

According to the present embodiment, the first CCD line sensor 26R1 and the second CCD line sensor 26R2 provided to the reading unit 7R for R are, as shown in FIG. 6A, FIG. 6B, and FIG. 6C, mounted so that the positions are separated each other by a predetermined distance in the sub-scanning direction of the original document, respectively. Specifically, their reading positions are separated each other by a distance according to one reading area that are read by the first CCD line sensor 26R1 and the second CCD line sensor 26R2, respectively.

Further, it is described herein about the reading process with a high resolution for reading the image with an interval that is half of the interval between the reading position of the first CCD line sensor 26R1 and the reading position of the second CCD line sensor 26R2. Namely it is described herein about the reading process with a resolution that is twice as much as the resolution defined by the interval between the reading position of the first CCD line sensor 26R1 and the reading position of the reading position of the second CCD line sensor 26R2.

More specifically, as shown in FIG. 6A, the second CCD line sensor 26R2 may read a reading area "3" at a timing that the first CCD line sensor 26R1 reads a reading area "1". Further, as shown in FIG. 6B, the second CCD line sensor 26R2 may read a reading area "4" at a timing that the first CCD line sensor 26R1 reads a reading area "2", and as shown in FIG. 6C, the second CCD line sensor 26R2 may read a reading area "5" at a timing that the first CCD line sensor 26R1 reads a reading area "3".

At the timing t1 in FIG. 5, and as shown in FIG. 6A, in a case where the control unit 1 inputs the first gate control signal "1" into the gate terminal of the first shift gate circuit 28a, electric charges (signals) based on the light reflected from the reading area "1" that are accumulated in the first CCD line sensor 26R1 by that time are transferred to the first delay circuit 27R1 via the first shift gate circuit 28a. In a case where the control unit 1 inputs the second gate control signal "1" into the gate terminal of the second shift gate circuit 28b at the same timing t1, electric charges (signals) based on the light reflected from the reading area "3" that are accumulated in the second CCD line sensor 26R2 in the meantime are transferred to the first storage circuit 27R20 via the second shift gate circuit 28b.

Further, as shown in FIG. 6A, at the timing t1, the signal based on the light reflected from the reading area "2" has been stored in the second storage circuit 27R21 in the second delay circuit 27R2, and the signal based on the light reflected from the reading area "1" has been stored in the second shift register 27R22.

In a state shown in FIG. 6A, in a case where a predetermined time has been passed after the control unit 1 inputs the first gate control signal "0" in the gate terminal of the first shift gate circuit 28a and inputs the second gate control signal "0" in the gate terminal of the second shift gate circuit 28b, the control unit 1 may input the first output control signal "1" in the first shift register 27R1, and may input the second output control signal "1" in the second shift register 27R22. Thereby, the first shift register 27R1 and the second shift register 27R22 may output the signal based on the light reflected from the reading area "1" that is retained by each register to the adder 80R for R in series.

The data output from the first shift register 27R1 and the second shift register 27R22 (the image data of the reading area "1") are processed with various processes by the processing part 81 of the image processing unit 8 after being added by the adder 80R for R.

As shown in FIG. 5, the control unit 1 may input the third gate control signal "1" into the gate terminal of the third shift gate circuit 28c and may transfer the data held in each device of the first storage circuit 27R20 (the signal based on the reflected light from the reading area "3") to the second storage circuit 27R21 via the third shift gate circuit 28c, before inputting the second gate control signal "1" into the gate terminal of the second shift gate circuit 28b at the timing t2.

Further, the control unit 1 may input the fourth gate control signal "1" into the gate terminal of the fourth shift gate circuit 28d and may transfer the data held in each device of the second storage circuit 27R21 (the signal based on the reflected light from the reading area "2") to the second shift register 27R22 via the forth shift gate circuit 28d, before inputting the third gate control signal "1" into the gate terminal of the third shift gate circuit 28c.

Then, as shown in FIG. 5 at the timing t2 and in FIG. 6B, in a case where the control unit 1 inputs the first gate control signal "1" into the gate terminal of the first shift gate circuit 28a and inputs the second gate control signal "1" into the gate terminal of the second shift gate circuit 28b, signals based on the light reflected from the reading area "2" that are accumulated in the first CCD line sensor 26R1 in the meantime are transferred to the first delay circuit 27R1 via the first shift gate circuit 28a, and signals based on the light reflected from the reading area "4" that are accumulated in the second CCD line sensor 26R2 are transferred to the first storage circuit 27R20 via the second shift gate circuit 28b.

Further, as described above, by inputting the third gate control signal "1" and the fourth gate control signal "1" in the third shift gate circuit 28c and the fourth shift gate circuit 28d at a predetermined timing, respectively, as shown in FIG. 6B, the signal based on the reflected light from the reading area "3" has been stored in the second storage circuit 27R21 and the signal based on the reflected light from the reading area "2" has been stored in the second shift register 27R22 at the timing t2.

In a status shown in FIG. 6B, in a case where a predetermined time has been passed after the control unit 1 inputs the first gate control signal "0" into the gate terminal of the first shift gate circuit 28a and inputs the second gate control signal "0" into the gate terminal of the second shift gate circuit 28b, the control unit 1 may input the first output control signal "1" in the first shift register 27R1, and may input the second output control signal "1" in the second shift register 27R22. Thereby, the first shift register 27R1 and the second shift register 27R22 may serially output the signal based on the reflected light from the reading area "2" that is retained by each register to the adder 80R for R.

The data output from the first shift register 27R1 and the second shift register 27R22 (the image data of the reading area "2") are processed with various processes by the processing part 81 of the image processing unit 8 after being added (combined) by the adder 80R for R.

As shown in FIG. 5, the control unit 1 may input the third gate control signal "1" into the gate terminal of the third shift gate circuit 28c and may transfer the data retained in each device of the first storage circuit 27R20 (the signal based on the reflected light from the reading area "4") to the second storage circuit 27R21 via the third shift gate circuit 28c, before inputting the second gate control signal "1" into the gate terminal of the second shift gate circuit 28b at the timing t3.

Further, the control unit 1 may input the fourth gate control signal "1" into the gate terminal of the fourth shift gate circuit 28d and may transfer the data retained in each device of the second storage circuit 27R21 (the signal based on the reflected light from the reading area "3") to the second shift register 27R22 via the forth shift gate circuit 28d, before inputting the third gate control signal "1" into the gate terminal of the third shift gate circuit 28c.

Then, as shown in FIG. 5 at the timing t3 and FIG. 6C, in a case where the control unit 1 inputs the first gate control signal "1" into the gate terminal of the first shift gate circuit 28a and inputs the second gate control signal "1" into the gate terminal of the second shift gate circuit 28b, signals based on the reflected light from the reading area "3" that are accumulated in the first CCD line sensor 26R1 in the meantime are transferred to the first delay circuit 27R1 via the first shift gate circuit 28a, and signals based on the reflected light from the reading area "5" that are accumulated in the second CCD line sensor 26R2 are transferred to the first storage circuit 27R20 via the second shift gate circuit 28b.

Further, as described above, by inputting the third gate control signal "1" and the fourth gate control signal "1" into the third shift gate circuit 28c and the fourth shift gate circuit 28d at a predetermined timing, respectively, as shown in FIG. 6C, the signal based on the reflected light from the reading area "4" has been stored in the second storage circuit 27R21 and the signal based on the reflected light from the reading area "3" has been stored in the second shift register 27R22 at the timing t3.

In a status shown in FIG. 6C, in a case where a predetermined time has been passed after the control unit 1 inputs the first gate control signal "0" into the gate terminal of the first shift gate circuit 28a and inputs the second gate control signal "0" into the gate terminal of the second shift gate circuit 28b, the control unit 1 may input the first output control signal "1" into the first shift register 27R1, and may input the second output control signal "1" into the second shift register 27R22. Thereby, the first shift register 27R1 and the second shift register 27R22 may serially output the signal based on the reflected light from the reading area "3" that is retained by each register to the adder 80R for R.

The data output from the first shift register 27R1 and the second shift register 27R22 (the image data of the reading area "3") are processed with various processes by the processing part 81 of the image processing unit 8 after being added (combined) by the adder 80R for R.

As described above, according to the image reading apparatus of the present invention, there is a predetermined interval in the sub-scanning direction between the reading position of the first CCD line sensor 26R1 and the reading position of the second CCD line sensor 262, so that it is possible to carry out the reading process to read the image at a narrower interval than the above-described interval, namely, it is possible to carry out the reading process with a higher resolution than a resolution defined by the above-described interval.

Further, a period T0 (t2−t1 and t3−t2) to read the image data for each one line in the sub-scanning direction is decided by an interval P in the sub-scanning direction at each reading position of the first CCD line sensor 26R1 and the second CCD line sensor 26R2, and by a relative-moving speed V0 of the original document against the first CCD line sensor 26R1 and the second CCD line sensor 26R2. Upon reading the image with a high resolution as shown in FIG. 5, FIG. 6A, FIG. 6B, and FIG. 6C, the reading process is carried out at an interval that is half of the interval P, so that T0 can be calculated by T0=P/2/V0.

Next, it is described about the control process carried out by the control unit 1 and the reading process carried out by the image reading unit 7, when execution of reading with a low resolution is instructed via the operating unit 4. Specifically, it is described about the reading process with a low resolution to read the image at an interval between the reading positions of the first CCD line sensor 26R1 and the second CCD line sensor 26R2, which are provided to the reading unit 7R for R of the image reading unit 7. FIG. 7 is a time chart for describing the control process of the image reading unit 7 by the control unit 1, and FIG. 8A, FIG. 8B, and FIG. 8C are pattern views for describing the reading process by the image reading unit 7.

FIG. 7 shows a first gate control signal input in the first shift gate circuit 28a by the control unit 1; the data retained by the first shift register 27R1; a first output control signal input in the first shift register 27R1 by the control unit 1; a second gate control signal input in the second shift gate circuit 28b by the control unit 1; the data retained by the first storage circuit 27R20; a third gate control signal input in the third shift gate circuit 28c by the control unit 1; the data retained by the second storage circuit 27R21; a fourth gate control signal input in the fourth shift gate circuit 28d by the control unit 1; the data retained by the second shift register 27R22; and a second output control signal input in the second shift register 27R22 by the control unit 1, from the top to the bottom with a lateral axis defined as a temporal axis.

In other words, the signals related to the first CCD line sensor 26R1 and the first delay circuit 27R1 are described at upper portions from a dashed-dotted line of FIG. 7, and the signals related to the second CCD line sensor 26R2 and the first delay circuit 27R2 are described at lower portions from a dashed-dotted line of FIG. 7, respectively.

FIG. 8A, FIG. 8B, and FIG. 8C paternally show the status when the reading unit 7R for R of the image reading unit 7 is reading the original document. FIG. 8A shows the status at a timing t4 in FIG. 7; FIG. 8B shows the status at a timing t5 in FIG. 7; and FIG. 8C shows the status at a timing t6 in FIG. 7, respectively. Further, FIG. 8A, FIG. 8B and FIG. 8C show views looking, from a horizontal direction that is perpendicular to the sub-scanning direction, the original document S moving in a direction shown by an arrow A (a sub-scanning direction); and reference numerals "1" to "7" in FIG. 8A, FIG. 8B, and FIG. 8C show reading areas that are read by the first CCD line sensor 26R1 and the second CCD line sensor 26R2 with a longitudinal direction according with a main scanning direction.

According to the present embodiment, the first CCD line sensor 26R1 and the second CCD line sensor 26R2 provided to the reading unit 7R for R are, as shown in FIG. 8A, FIG. 8B, and FIG. 8C, mounted so that the positions separated each other from a predetermined distance in the sub-scanning direction of the original document become their reading positions, respectively. Specifically, their reading positions are separated each other by a distance according to one reading area that are read by the first CCD line sensor 26R1 and the second CCD line sensor 26R2, respectively.

Further, it is described about the reading process with a low resolution for reading the image at the interval between the reading position of the first CCD line sensor 26R1 and the reading position of the second CCD line sensor 26R2, namely, it is described about the reading process with a resolution that is defined by the interval between the reading position of the first CCD line sensor 26R1 and the reading position of the reading position of the second CCD line sensor 26R2.

More specifically, as shown in FIG. 8A, the second CCD line sensor 26R2 may read a reading area "3" at a timing that the first CCD line sensor 26R1 reads a reading area "1". Further, as shown in FIG. 8B, the first CCD line sensor 26R1 may read a reading area "3" at a next timing that the second CCD line sensor 26R2 may read a reading area "5". As shown in FIG. 8C, the first CCD line sensor 26R1 may read a reading area "5" at a next timing that the second CCD line sensor 26R2 may read a reading area "7" at this timing.

At the timing t4 in FIG. 7, in a case where the control unit 1 inputs the first gate control signal "1" into the gate terminal of the first shift gate circuit 28a, electric charges (signals) based on the reflected light from the reading area "1" that are accumulated in the first CCD line sensor 26R1 in the meantime are transferred to the first delay circuit 27R1 via the first shift gate circuit 28a. In addition, in a case where the control unit 1 inputs the second gate control signal "1" into the gate terminal of the second shift gate circuit 28b at the same timing t4, electric charges (signals) based on the reflected light from the reading area "3" that are accumulated in the second CCD line sensor 26R2 in the meantime are transferred to the first storage circuit 27R20 via the second shift gate circuit 28b.

In a case where a predetermined time has been passed after the control unit 1 inputs the second gate control signal "0" in the gate terminal of the second shift gate circuit 28b, the control unit 1 may input the third gate control signal "1" into the gate terminal of the third shift gate circuit 28c, and may transfer the data retained in each device of the first storage circuit 27R20 (the signal based on the light reflected from the reading area "3") to the second storage circuit 27R21 via the third shift gate circuit 28c. FIG. 8A shows a status at this time, and the signal based on the light reflected from the reading area "1" has been stored in the second shift register 27R22 in the second delay circuit 27R2.

In a status shown in FIG. 8A where a predetermined time has been passed after the control unit 1 inputs the first gate control signal "0" into the gate terminal of the first shift gate circuit 28a and inputs the second gate control signal "0" into the gate terminal of the second shift gate circuit 28b, the control unit 1 may input the first output control signal "1" into the first shift register 27R1, and may input the second output control signal "1" into the second shift register 27R22. Thereby, the first shift register 27R1 and the second shift register 27R22 may serially output the signal based on the light reflected from the reading area "1" that is retained by each register to the adder 80R for R.

The data output from the first shift register 27R1 and the second shift register 27R22 (the image data of the reading area "1") are processed with various processes by the processing part 81 of the image processing unit 8 after being added (combined) by the adder 80R for R.

As shown in FIG. 7, the control unit 1 may input the fourth gate control signal "1" into the gate terminal of the fourth shift gate circuit 28d, and may transfer the data held in each device of the second storage circuit 27R21 (the signal based on the reflected light from the reading area "3") to the second shift register 27R22 via the fourth shift gate circuit 28d, before inputting the second gate control signal "1" into the gate terminal of the second shift gate circuit 28b at the timing t5.

Then, at the timing t5 in FIG. 7, in a case where the control unit 1 inputs the first gate control signal "1" into the gate terminal of the first shift gate circuit 28a and inputs the second gate control signal "1" into the gate terminal of the second shift gate circuit 28b, signals based on the light reflected from the reading area "3" that are accumulated in the first CCD line sensor 26R1 in the meantime are transferred to the first delay circuit 27R1 via the first shift gate circuit 28a, and signals based on the reflected light from the reading area "5" that are accumulated in the second CCD line sensor 26R2 are transferred to the first storage circuit 27R20 via the second shift gate circuit 28b.

In a case where a predetermined time has been passed after the control unit 1 inputs the second gate control signal "0" into the gate terminal of the second shift gate circuit 28b, the control unit 1 may input the third gate control signal "1" into the gate terminal of the third shift gate circuit 28c, and may transfer the data held in each device of the first storage circuit 27R20 (the signal based on the light reflected from the reading area "5") to the second storage circuit 27R21 via the third shift gate circuit 28c.

FIG. 8B shows the status at this time, and the signal based on the reflected light from the reading area "3" has been stored in the second shift register 27R22 by inputting the fourth gate control signal "1" into the gate terminal of the fourth shift gate circuit 28d at a predetermined timing, as described above.

In a status shown in FIG. 8B where a predetermined time has been passed after the control unit 1 inputs the first gate control signal "0" into the gate terminal of the first shift gate circuit 28a and inputs the second gate control signal "0" into the gate terminal of the second shift gate circuit 28b, the control unit 1 may input the first output control signal "1" into the first shift register 27R1, and may input the second output control signal "1" into the second shift register 27R22. Thereby, the first shift register 27R1 and the second shift register 27R22 may serially output the signal based on the light reflected from the reading area "3" that is retained by each register to the adder 80R for R.

The data output from the first shift register 27R1 and the second shift register 27R22 (the image data of the reading area "3") are processed with various processes by the processing part 81 of the image processing unit 8 after being added by the adder 80R for R.

As shown in FIG. 7, the control unit 1 may input the fourth gate control signal "1" into the gate terminal of the fourth shift gate circuit 28d and may transfer the data retained in each device of the second storage circuit 27R21 (the signal based on the reflected light from the reading area "5") to the second shift register 27R22 via the fourth shift gate circuit 28d, before inputting the second gate control signal "1" into the gate terminal of the second shift gate circuit 28b at the timing t6.

Then, in a case where the control unit 1 inputs the first gate control signal "1" into the gate terminal of the first shift gate circuit 28a and inputs the second gate control signal "1" into the gate terminal of the second shift gate circuit 28b at the timing t6 in FIG. 7, signals based on the reflected light from the reading area "5" that are accumulated in the first CCD line sensor 26R1 in the meantime are transferred to the first shift register 27R1 via the first shift gate circuit 28a, and signals based on the reflected light from the reading area "7" that are accumulated in the second CCD line sensor 26R2 are transferred to the first storage circuit 27R20 via the second shift gate circuit 28b.

In a case where a predetermined time has been passed after the control unit 1 inputs the second gate control signal "0" into the gate terminal of the second shift gate circuit 28b, the control unit 1 may input the third gate control signal "1" into the gate terminal of the third shift gate circuit 28c, and may transfer the data retained in each device of the first storage circuit 27R20 (the signal based on the reflected light from the reading area "7") to the second storage circuit 27R21 via the third shift gate circuit 28c.

FIG. 8C shows the status at this time, and the signal based on the reflected light from the reading area "5" has been stored in the second shift register 27R22 by inputting the fourth gate control signal "1" into the gate terminal of the fourth shift gate circuit 28d at a predetermined timing with the operation of the control unit 1, as described above.

In a status shown in FIG. 8C where a predetermined time has been passed after the control unit 1 inputs the first gate control signal "0" into the gate terminal of the first shift gate circuit 28a and inputs the second gate control signal "0" into the gate terminal of the second shift gate circuit 28b, the control unit 1 may input the first output control signal "1" into the first shift register 27R1, and may input the second output control signal "1" into the second shift register 27R22. Thereby, the first shift register 27R1 and the second shift register 27R22 may serially output the signal based on the reflected light from the reading area "5" that is retained by each register to the adder 80R for R.

The data output from the first shift register 27R1 and the second shift register 27R22 (the image data of the reading area "5") are processed with various processes by the processing part 81 of the image processing unit 8 after being added by the adder 80R for R.

As described above, in the reading process with a resolution (a low resolution) defined by the interval between the reading position of the first CCD line sensor 26R1 and the reading position of the second CCD line sensor 26R2, a period T1 (t5–t4 and t6–t5) to read the image data for each one line in the sub-scanning direction is decided by an interval P between each reading position of the first CCD line sensor 26R1 and the second CCD line sensor 26R2 in the sub-scanning direction, and by a relative-moving speed V1 of the original document against the first CCD line sensor 26R1 and the second CCD line sensor 26R2. Upon reading the image with a low resolution as shown in FIG. 7, FIG. 8A, FIG. 8B, and FIG. 8C, the reading process is carried out at an interval P, so that T1 can be calculated by T1=P/V1.

Here, in the reading process with the low resolution, the relative-moving speed V1 of the original document against the first CCD line sensor 26R1 and the second CCD line sensor 26R2 can be determined so as to be two times faster than the relative moving speed V0 for the above-described reading process with the high resolution (V1=V0×2). Therefore, T1=P/(V0×2) is established, and then, T0=T1 is acquired. In other words, in the case of reading the image with the high resolution, it is not necessary to lower the reading speed as compared to the case of reading the image with the low resolution, and it is possible to provide the image reading apparatus having a high efficiency in reading the original document. Further, one image data is captured by adding each image data acquired by the first CCD line sensor 26R1 and the second COD line sensor 26R2 with the same reading area, respectively, so that the image reading apparatus can acquire a high quality image data.

Even in a case where the moving speed V1 of the original document upon reading the image with the low resolution is made into two times as much as the moving speed V0 of the original document upon reading the image with the high resolution, a time for accumulating the electric charges by respective photo registers of the first CCD line sensor 26R1 and the second CCD line sensor 26R2 per period upon reading the image with the low resolution is equal to the time for accumulating the electric charges per period upon reading the image with the high resolution. Thus, the quality of the output image data is not reduced, even in reading with the low resolution.

In the case of the reading process with the low resolution as shown in FIG. 8A, FIG. 8B, and FIG. 8C, a reading area becomes discrete as compared to the case of reading process with the high resolution as shown in FIG. 6A, FIG. 6B, and FIG. 6C. Specifically, in the case of the reading process with the low resolution, reading areas "2", "4", and "6" in FIG. 8A, FIG. 8B, and FIG. 8C are not read. However, an area of one pixel to be read upon reading process with the low resolution can be made to be equal to an area of one pixel upon reading process with the high resolution, so that a fine image without a blurring can be acquired even in the reading process with the low resolution.

As described above, regardless of whether reading process with the low resolution or reading process with the high resolution, the scanner apparatus 100 according to the present embodiment can match a timing to output an image data for a reading area from the first shift register 27R1 with a timing to output an image data for the same reading area from the second shift register 27R22, by changing a transfer timing (an output timing) of the data from the first storage circuit 27R20 of the second delay circuit 27R2 of the reading unit 7R for R to the second storage circuit 27R21.

Specifically, the second delay circuit 27R2 may retain the image data two periods longer than the first delay circuit 27R1 upon the reading process with the low resolution, because the reading area read by the second CCD line sensor 26R2 is read by the first CCD line sensor 26R1 after passing two periods, as shown in FIG. 6A, FIG. 6B, and FIG. 6C. On the other hand, the second delay circuit 27R2 may retain the image data one period longer than the first delay circuit 27R1 upon the reading process with the high resolution, because the reading area read by the second CCD line sensor 26R2 is read by the first CCD line sensor 26R1 after passing one period, as shown in FIG. 8A, FIG. 8B, and FIG. 8C. Thereby, the adder 80R for R may simply add the input image data, so that it is possible to reduce the workload of the image processing unit 8.

In the embodiment described above, the control unit (the reading control unit) 1 is configured to change the reading positions for respective CCD line sensors in sequence, by changing the moving speed of the original document transported by the original document transporting unit 6, without changing the reading periods (the reading timings) of respective CCD line sensors provided to the image reading unit 7, depending on the case of reading with low resolution and high resolution. However, the control unit may be configured to control the reading positions to be read by respective CCD line sensors, for example, by changing appropriately the reading timings of respective CCD line sensors without changing moving speed of the original document.

In the embodiment described above, the low resolution is defined as the resolution depending on the interval between each of the reading positions of the first CCD line sensors 26R1, 26G1, and 26B1 and each of the reading positions of the second CCD line sensors 26R2, 26G2, and 26B2, and the image reading unit 7 is configured to read the reading positions which are sequentially changed by the interval, upon reading with the low resolution. Furthermore, the high resolution is defined as the resolution depending on the half distance of the interval (a resolution two times as much as a low resolution), and the image reading unit 7 is configured to read the reading positions which are sequentially changed by the half distance of the interval, upon reading with the high resolution.

Similarly, it is possible to define a resolution depending on the ⅓ distance of the interval between each of the reading positions of the first CCD line sensors 26R1, 26G1, and 26B1 and each of the reading positions of the second CCD line sensors 26R2, 26G2, and 26B2 (a resolution three times as much as a low resolution). In this case, the image reading unit 7 should be configured to read the reading positions which are sequentially changed by the ⅓ distance of the interval. In other words, when reading with a resolution predetermined number times as much as a low resolution, the image reading unit 7 should be configured to read the reading positions which are sequentially changed by the 1/predetermined number distance of the interval between each of the reading positions of the first CCD line sensors 26R1, 26G1, and 26B1 and each of the reading positions of the second CCD line sensors 26R2, 26G2, and 26B2.

In the embodiment described above, the reading unit 7R for R, the reading unit 7G for G, and the reading unit 7B for B provided to the image reading unit 7 are configured to have two CCD line sensors (the first CCD line sensors 26R1, 26G1, and 26B1 and the second CCD line sensors 26R2, 26G2, and 26B2), respectively. However, not limited to this, the image reading unit 7 may be also configured to have three or more CCD line sensors for each color component. In this case, the reading positions due to respective CCD line sensors for each color component may be arranged to be separated at predetermined intervals in the sub-scanning direction, and it is possible to capture the image data with higher image quality, by adding the all image data read by respective CCD line sensors. In this case, it should be noted to connect more storage circuits in series for a CCD line sensor, as the CCD line sensor is arranged on the upstream side in the sub-scanning direction.

As this invention may be embodied in several forms without departing from the spirit of essential characteristics thereof the present embodiments are therefore illustrative and not restrictive, since the scope of the invention is defined by the appended claims rather than by the description preceding them, and all changes that fall within metes and bounds of the claims, or equivalence of such metes and bounds thereof are therefore intended to be embraced by the claims.

What is claimed is:

1. An image reading apparatus for reading an original document and capturing image data, the apparatus comprising:
   a plurality of image reading units, each of which is arranged so as to move relatively with respect to the original document, capture the image data by reading an area of the original document with a longitudinal direction perpendicular to the moving direction, and have a reading position separated by a predetermined distance in the moving direction;
   an accepting unit for accepting a resolution utilized to read the original document by the plurality of image reading units;
   a read controlling unit for changing a position of the read area on the original document, which is utilized by each of the plurality of image reading units based, on the resolution accepted by the accepting unit; and
   a combining unit for combining the image data captured from a same reading position by each of the plurality of image reading units, wherein
   the read controlling unit changes each reading position of the image reading units by controlling each reading timing of the image reading units based on the resolution accepted by the accepting unit,
   the accepting unit accepts a first resolution or a second resolution that is lower than the first resolution,
   in a case where the accepting unit accepts the first resolution, the read controlling unit changes each reading position of the image reading units continuously to be separated by a shorter distance than the predetermined distance, and
   in a case where the accepting unit accepts the second resolution, the read controlling unit changes each reading position of the image reading units continuously with the predetermined distance serving as one unit.

2. The image reading apparatus according to claim 1, further comprising:

a move controlling unit for controlling a relative-moving speed between the original document and each of the image reading units, wherein in a case where the accepting unit accepts the second resolution, the move controlling unit controls the relative-moving speed faster than a case of accepting the first resolution.

3. The image reading apparatus according to claim 2, wherein each of the image reading units comprises:

a photoelectric converting device for converting a reflected light from the original document into an electric signal; and a retaining device, which is connected to the photoelectric converting device in series, for retaining the electric signal converted from the reflected light by the photoelectric converting device for a predetermined time before outputting the electric signal; wherein the image reading unit located on the upstream side in the moving direction among the image reading units has more retaining devices; and the combining unit combines the image data output from the retaining device comprised in each of the image reading units.

4. The image reading apparatus according to claim 3, further comprising:

an output timing controlling unit for controlling an output timing of an electric signal from each retaining device of the image reading units based on the first resolution or the second resolution accepted by the accepting unit.

5. The image reading apparatus according to claim 4, wherein the image reading unit captures the image data having a plurality of color components; and the photoelectric converting device corresponds to each color of the image data having a plurality of color components.

6. The image reading apparatus according to claim 3, wherein the image reading unit captures the image data having a plurality of color components; and the photoelectric converting device corresponds to each color of the image data having a plurality of color components.

7. An image reading apparatus for reading an original document and capturing image data, the apparatus comprising:

a plurality of image reading units, each of which is arranged so as to move relatively with respect to the original document, capture the image data by reading an area of the original document with a longitudinal direction perpendicular to the moving direction, and have a reading position separated by a predetermined distance in the moving direction;

an accepting unit for accepting a resolution utilized to read the original document by the plurality of image reading units;

a read controlling unit for changing a position of the read area on the original document, which is utilized by each of the plurality of image reading units based, on the resolution accepted by the accepting unit; and a combining unit for combining image data captured from a same reading position by each of the plurality of image reading units, wherein each of the image reading units comprises:

a photoelectric converting device for converting a reflected light from the original document into an electric signal; and a retaining device, which is connected to the photoelectric converting device in series, for retaining the electric signal converted from the reflected light by the photoelectric converting device for a predetermined time before outputting the electric signal; wherein the image reading unit located on the upstream side in the moving direction among the image reading units has more retaining devices; and the combining unit combines the image data output from the retaining device comprised in each of the image reading units.

8. An image reading apparatus for reading an original document and capturing image data, the apparatus comprising:

a plurality of image reading units, each of which is arranged so as to move relatively with respect to the original document, capture the image data by reading an area of the original document with a longitudinal direction perpendicular to the moving direction, and have a reading position separated by a predetermined distance in the moving direction;

an accepting unit for accepting a resolution utilized to read the original document by the plurality of image reading units;

a read controlling unit for changing a position of the read area on the original document, which is utilized by each of the plurality of image reading units based, on the resolution accepted by the accepting unit; and a combining unit for combining image data captured from a same reading position by each of the plurality of image reading units, wherein the accepting unit accepts a first resolution or a second resolution that is lower than the first resolution;

in a case where the accepting unit accepts the first resolution, the read controlling unit changes each reading position of the image reading units continuously to be separated by a shorter distance than the predetermined distance; and in a case where the accepting unit accepts the second resolution, the read controlling unit changes each reading position of the image reading units continuously with the predetermined distance serving as one unit.

9. An image reading apparatus for reading an original document and capturing image data, the apparatus comprising:

a plurality of image reading means, each of which is arranged so as to move relatively with respect to the original document, capture the image data by reading an area with a longitudinal direction perpendicular to the moving direction, and have a position as a reading position separated by a predetermined distance in the moving direction;

an accepting means for accepting a resolution utilized to read the original document by the plurality of image reading means;

a read controlling means for changing a position of the read area on the original document, which is utilized by each of the plurality of image reading means based on the resolution that is accepted by the accepting means; and a combining means for combining image data that are captured from a same reading position by each of the plurality of image reading means, wherein the accepting means accepts a first resolution or a second resolution that is lower than the first resolution, in a case where the accepting means accepts the first resolution, the read controlling means changes each reading position of the image reading means continuously to be separated by a shorter distance than the predetermined distance, and in a case where the accepting means accepts the second resolution, the read controlling means changes each reading position of the image reading means continuously with the predetermined distance serving as one unit.

10. The image reading apparatus according to claim 9, wherein the read controlling means changes each reading position of the image reading means by controlling each reading timing of the image reading means based on the resolution accepted by the accepting means.

11. The image reading apparatus according to claim 9, further comprising:

a move controlling means for controlling a relative-moving speed between the original document and each of the image reading means, wherein in a case where the accepting means accepts the second resolution, the move controlling means control the relative-moving speed faster than a case of accepting the first resolution.

12. An image reading apparatus for reading an original document and capturing image data, the apparatus comprising:

a plurality of image reading means, each of which is arranged so as to move relatively with respect to the original document, capture the image data by reading an area with a longitudinal direction perpendicular to the moving direction, and have a position as a reading position separated by a predetermined distance in the moving direction;

an accepting means for accepting a resolution utilized to read the original document by the plurality of image reading means;

a read controlling means for changing a position of the read area on the original document, which is utilized by each of the plurality of image reading means based on the resolution that is accepted by the accepting means; and a combining means for combining image data that are captured from a same reading position by each of the plurality of image reading means, wherein each of the image reading means comprises:

a photoelectric converting means for converting a reflected light from the original document into an electric signal; and a retaining means, which is connected to the photoelectric converting means in series, for retaining an electric signal converted from the reflected light by the photoelectric converting means for a predetermined time before outputting the electric signal; wherein the image reading means located on the upstream side in the moving direction among the image reading means has more retaining means; and the combining means combines the image data output from the retaining means comprised in each of the image reading means.

13. The image reading apparatus according to claim 12, further comprising:

an output timing controlling means for controlling an output timing of an electric signal from each retaining means of the image reading means based on the first resolution or the second resolution accepted by the accepting means.

14. The image reading apparatus according to claim 12, wherein the image reading means captures the image data having a plurality of color components; and the photoelectric converting means corresponds to each color of the image data having a plurality of color components.

\* \* \* \* \*